United States Patent
Steinheider et al.

(10) Patent No.: US 7,554,960 B2
(45) Date of Patent: Jun. 30, 2009

(54) REDUCING COST OF CELLULAR BACKHAUL

(75) Inventors: Jeffrey Steinheider, Arlington, MA (US); Vanu Bose, Boston, MA (US)

(73) Assignee: Vanu, Inc., Cambridge, MA (US)

( * ) Notice: Subject to any disclaimer, the term of this patent is extended or adjusted under 35 U.S.C. 154(b) by 603 days.

(21) Appl. No.: 11/148,953

(22) Filed: Jun. 9, 2005

(65) Prior Publication Data

US 2006/0007919 A1    Jan. 12, 2006

Related U.S. Application Data

(60) Provisional application No. 60/578,266, filed on Jun. 9, 2004.

(51) Int. Cl.
    *H04W 4/00* (2009.01)
(52) U.S. Cl. .................. 370/338; 370/317
(58) Field of Classification Search .............. None
    See application file for complete search history.

(56) References Cited

U.S. PATENT DOCUMENTS

| | | | |
|---|---|---|---|
| 5,805,633 A | 9/1998 | Uddenfeldt | |
| 5,901,182 A | 5/1999 | Kot | |
| 5,931,964 A | 8/1999 | Beming et al. | |
| 5,973,643 A | 10/1999 | Hawkes et al. | |
| 6,016,322 A | 1/2000 | Goldman | |
| 6,035,207 A | 3/2000 | Wang et al. | |
| 6,154,507 A | 11/2000 | Bottomley | |
| 6,285,876 B1 | 9/2001 | Zhong | |
| 6,356,911 B1 | 3/2002 | Shibuya | |
| 6,381,726 B1 | 4/2002 | Weng | |
| 6,442,392 B2 | 8/2002 | Ruutu et al. | |
| 6,477,150 B1 * | 11/2002 | Maggenti et al. | 370/312 |
| 6,490,327 B1 | 12/2002 | Shah | |
| 6,546,256 B1 | 4/2003 | Maloney et al. | |
| 6,560,462 B1 | 5/2003 | Ravi et al. | |
| 6,621,807 B1 | 9/2003 | Jung et al. | |
| 6,631,142 B2 | 10/2003 | Miyamoto et al. | |
| 6,665,283 B2 * | 12/2003 | Harris et al. | 370/333 |
| 6,757,544 B2 | 6/2004 | Rangarajan et al. | |
| 6,788,750 B1 | 9/2004 | Reuven et al. | |
| 6,915,123 B1 | 7/2005 | Daudelin et al. | |
| 6,920,125 B1 | 7/2005 | Wu | |
| 6,973,308 B1 * | 12/2005 | Smith | 455/436 |
| 6,978,124 B2 | 12/2005 | Benes et al. | |
| 6,987,798 B2 | 1/2006 | Ahn et al. | |
| 7,013,150 B2 | 3/2006 | Okanoue et al. | |
| 7,068,638 B2 | 6/2006 | Choi et al. | |
| 2002/0126631 A1 * | 9/2002 | Lee | 370/328 |
| 2003/0012265 A1 | 1/2003 | Lin | |
| 2003/0031210 A1 * | 2/2003 | Harris | 370/516 |
| 2003/0063595 A1 | 4/2003 | You et al. | |
| 2004/0062214 A1 | 4/2004 | Schnack et al. | |
| 2004/0076191 A1 * | 4/2004 | Sundqvist et al. | 370/516 |

(Continued)

OTHER PUBLICATIONS

International Search Report, PCT/US03/36709, mailed on May 25, 2004, 4 pgs.

(Continued)

*Primary Examiner*—Phirin Sam
(74) *Attorney, Agent, or Firm*—Fish & Richardson P.C.

(57) ABSTRACT

Methods and systems for reducing the cost of cellular backhaul are disclosed.

13 Claims, 7 Drawing Sheets

U.S. PATENT DOCUMENTS

| | | | |
|---|---|---|---|
| 2004/0114623 A1 | 6/2004 | Smith | |
| 2004/0120309 A1* | 6/2004 | Kurittu et al. | 370/352 |
| 2004/0179555 A1* | 9/2004 | Smith | 370/521 |
| 2004/0209580 A1 | 10/2004 | Steinheider et al. | |
| 2004/0252665 A1 | 12/2004 | Clark et al. | |
| 2004/0259571 A1 | 12/2004 | Joshi | |
| 2005/0068943 A1* | 3/2005 | Scheinert | 370/352 |
| 2005/0163075 A1 | 7/2005 | Malladi et al. | |
| 2005/0228854 A1 | 10/2005 | Steinheider et al. | |
| 2005/0232241 A1* | 10/2005 | Wu et al. | 370/352 |
| 2005/0286536 A1 | 12/2005 | Steinheider et al. | |
| 2006/0007919 A1 | 1/2006 | Bose et al. | |
| 2006/0291455 A1* | 12/2006 | Katz et al. | 370/355 |

OTHER PUBLICATIONS

Cormen et al., 2001, Introduction to Algorithms Second Edition, McGraw-Hill, Boston.

Ekroot, L. and Dolinar, S., "A* Decoding of Block Codes", *IEEE Transactions on Communications*, vol. 44 (9):1052-1056 (1996).

Fano, "A Heuristic Discussion of Probabilistic Decoding", *IEEE Transactions on Information Theory*, vol. IT9(1):64-74 (1963).

Forney, Jr., "Convolutional Codes II. Maximum-Likelihood Decoding", *Information and Control*, vol. 25:222-266 (1974).

Forney, Jr., "The Viterbi Algorithm", *Proceedings of the IEEE*, vol. 61(3):268-278 (1973).

Han et al., "Efficient Priority-First Search Maximum-Likelihood Soft-Decision Decoding of Linear Block Codes", *IEEE Transactions on Information Theory*, vol. 39(5):1514-1523 (1993).

Han et al., "A Maximum-Likelihood Soft-Decision Sequential Decoding Algorithm for Binary Convolutional Codes", *IEEE Transactions on Communications*, vol. 50(2):173-178 (2002).

Heller, J. and Jacobs, I. M., "Viterbi Decoding for Satellite and Space Communication", *IEEE Transactions on Communication Technology*, vol. Com-19(5):835-848 (1971).

Kang, G. and Zhang, P., "The Implementation of Viterbi Decoder on TMS320C6201 DSP in WCDMA System", *Beijing University of Posts and Telecommunications*.

Rajagopal, S., "A Real-Time Baseband Communications Processor for High Data Rate Wireless Systems", Dept. of Electrical and Computer Engineering, Rice University (2002).

Sereni et al., "A Software Re-Configurable Architecture for 3G and Wireless Systems", University of Perugia, Italy (2000).

Varga, R. and Harrison, M. (eds), The Art of Computer Programming-Second Edition, Addison-Wesley, Massachusetts (1973).

Viterbi, "Error Bounds for Convolutional Codes and an Asymptotically Optimum Decoding Algorithm", *IEEE Transactions on Information Theory*, vol. IT-13(2):260-269 (1967).

Wicker, S. B., Error Control Systems for Digital Communication and Storage, Prentice Hall, Englewood Cliffs, NJ (1995).

International Search Report—PCT/US03/25218.

M. Abramowitz, et al, *Handbook of Mathematical Functions with Formulas, Graphs and Mathematical Tables*, Dover Publications, New York, 1965.

J.L. Massey, *Threshold Decoding*, Technical Report 410, MIT Press, Cambridge, MA, 1963.

K. Paterson, et al., *Efficient Decoding Algorithms for Generalised Reed-Muller Codes*, Technical Report, Hewlett-Packard Labs, Nov. 1998.

Bob Pearson, *Complementary Code Keying Made Simple*, Application Note 9850, http://www/intersil.com/data/an/an9/an9850/an9850.pdf, May 2000.

I. Reed, *A Class of Multiple-Error-Correcting Codes and the Decoding Scheme*, IRE Transactions on Information Theory, PGIT-4:38-49, Sep. 1954.

R. van Nee, *OFDM Codes for Peak-to-Average Power Reduction and Error Correction*, In Proc. IEEE Globecom '96, London, England, pp. 740-744, Nov. 1996.

G.N. Watson, *A Treatise on the Theory of Bessel Functions*, Second Edition, Cambridge University Press, 1952.

R.K. Yarlagadda, et al., *Hadamard Matrix Analysis and Synthesis*, Luwer Academic Publishers, Dordrecht, 1997.

International Search Report PCT/US03/25219 mailed Dec. 16, 2003.

http://www.fcc.gov/911/enhanced/.

http://www.arraycomm.com/.

EIA/TIA/IS-95 Mobile Station-Base Station Compatibility Standard for Dual-Mode Wideband Spread Spectrum Cellular System, Telecommunications Industry Association, Jul. 1993, pp. 6-1 to 6-8.

L. Trevisan, "Some Applications of Coding Theory in Computational Complexity," Quaderni di Matematica, vol. 13, pp. 347-424, 2004.

J.S. Lee and L.E. Miller, CDMA Systems Engineering Handbook, Artech House, Boston, 1998.

A.J. Viterbi, CDMA: Principles of Spread Spectrum Communication, Addison-Wesley, Reading, MA, 1995.

A.V. Oppenheim and R.W. Schafer, with J.R. Buck, Discrete-Time Signal Processing, 2nd ed., Prentice Hall, Upper Saddle River, NJ, 1999.

V.S. Pless and W.C. Huffman, Eds., Handbook of Coding Theory, vol. 1, Elsevier Science, Amsterdam, 1998.

S.J. MacMullan and O.M. Collins, "A Comparison of Known Codes, Random Codes, and the Best Codes," IEEE Transactions on Information Theory, vol. 44, No. 7, pp. 3009-3022, Nov. 1998.

M. Luby, "LT-codes," in Proceedings of the 43rd Annual IEEE Symposium on the Foundations of Computer Science (FOCS), pp. 271-280, 2002.

A. Shokrollahi, "Raptor codes," in Proceedings of the IEEE International Symposium on Information Theory, p. 36, 2004.

International Search Report, PCT/US05/07136, mailed on Dec. 26, 2006, 6 pgs.

* cited by examiner

REDUCING COST OF CELLULAR BACKHAUL

PRIORITY TO OTHER APPLICATIONS

This application claims priority from and incorporates herein U.S. Provisional Application No. 60/578,266, filed Jun. 9, 2004, and titled "REDUCING THE COST OF CELLULAR BACKHAUL".

TECHNICAL FIELD

The following description relates to radio systems.

BACKGROUND

In cellular systems today, voice, data and signaling traffic must be backhauled from the cell tower sites to the central office where the mobile switching center is located. In general, backhauling refers to getting data to the core network, e.g., between the base station and the base station controller. In some cases, backhauling may include sending network data over an out-of-the-way route (including taking it farther than its destination) in order to get the data to its destination sooner or at a lower cost. Currently, a majority of this backhaul takes place over dedicated T1 lines. There are also some wireless backhaul schemes used primarily in short range niche applications that utilize both licensed and unlicensed bands.

Cellular backhaul primarily utilizes dedicated T1 lines. The guaranteed bandwidth and latency are important to support real time voice calls. Typically, T1 slots are dedicated to particular voice circuits or data channels. Bandwidth efficiencies of using IP over the backhaul to aggregate traffic and dynamically adapt capacity to the varying demand for data and voice are available, but are not used in the majority of deployments today.

While there are several wireless backhaul technologies, the interface to these systems is typically made to look like a T1 line. This allows the same interfaces and time slot assignments to be used. The advantage of wireless backhaul is lower cost compared to leasing T1 lines, but the wireless systems are often limited in range and by terrain.

There has been interest in using the public internet to backhaul cellular traffic given the wide availability and relatively low cost of internet connections compared with dedicated T1 lines.

In some aspects, the invention includes a method for backhauling wireless voice and data transmissions. The method includes receiving, at a base station, a wireless transmission. The method also includes forwarding the transmission from the base station to a base station controller over a shared network.

Embodiments can include one or more of the following.

The method can include receiving, at the base station controller, a second transmission and forwarding the second transmission to the base station over the shared network. The shared network can be a non-private network. The shared network can be the internet.

The method can also include providing a jitter buffer at the base station controller and using the jitter buffer to compensate for jitter introduced by the shared network. The method can also include providing a jitter buffer at the base station and using the jitter buffer to compensate for jitter introduced by the shared network.

Forwarding the transmission can include forwarding the transmission using a secure protocol. The secure protocol can be SSL.

The method can also include determining a priority of the received transmission and forwarding the transmission based on the determined priority. Determining a priority can include assigning a first priority to voice transmissions and assigning a second priority to data transmissions. The first priority can be greater than the second priority.

Forwarding the transmission can include forwarding the transmission using voice over IP technology. The method can also include performing decryption of the transmission at the base station controller. The method can also include performing encryption of the second transmission at the base station controller. The method can also include performing power control at the base station. The transmission can be a transmission from a cellular telephone.

In additional aspects, the invention includes a method that includes receiving, at a base station, a wireless transmission from a first mobile unit to be routed to a second mobile unit. The method also includes determining if the second mobile unit is within a communication range of the base station and if the second mobile unit is within the range, locally routing the transmission from the first mobile unit to the second mobile unit at the base station.

Embodiments can include one or more of the following.

The method can include forwarding the transmission from the base station to a base station controller if the second mobile unit is not within the range. Forwarding the transmission from the base station to the base station controller can include forwarding the transmission from the base station to the base station controller over a shared network. The shared network can be the internet.

In additional aspects, the invention includes a system for backhauling wireless voice and data transmissions. The system includes a base station configured to receive a wireless transmission and forward the transmission to a base station controller over a shared network.

Embodiments can include one or more of the following.

The system can also include a base station controller configured to receive a second transmission and forward the second transmission to the base station over the shared network. The shared network can be the internet. The base station controller can include a jitter buffer configured to compensate for jitter introduced by the shared network. The base station can include a jitter buffer configured to compensate for jitter introduced by the shared network. The base station can be further configured to determine a priority of the received transmission and forward the transmission based on the determined priority.

In additional aspects, the invention includes a system that includes a base station. The base station is configured to receive a wireless transmission from a first mobile unit to be routed to a second mobile unit and determine if the second mobile unit is within a communication range of the base station. If the second mobile unit is within the range, the base station is configured to locally route the transmission from the first mobile unit to the second mobile unit at the base station.

Embodiments can include one or more of the following.

The system can also include a base station controller. The base station can be configured to forward the transmission to the base station controller if the second mobile unit is not within the range.

Advantages that can be seen in particular implementations include one or more of the following.

In some embodiments, using a software radio system can reduce the cost of cellular backhaul.

In some embodiments, the software radio system allows one to perform rapid experiments and any changes to the system or protocol can be software downloads to the infrastructure.

In some embodiments, the software radio system employs QoS measurements and mechanisms to ensure adequate bandwidth and latency to support voice and data user requirements.

DETAILED DESCRIPTION

Figure 1A:
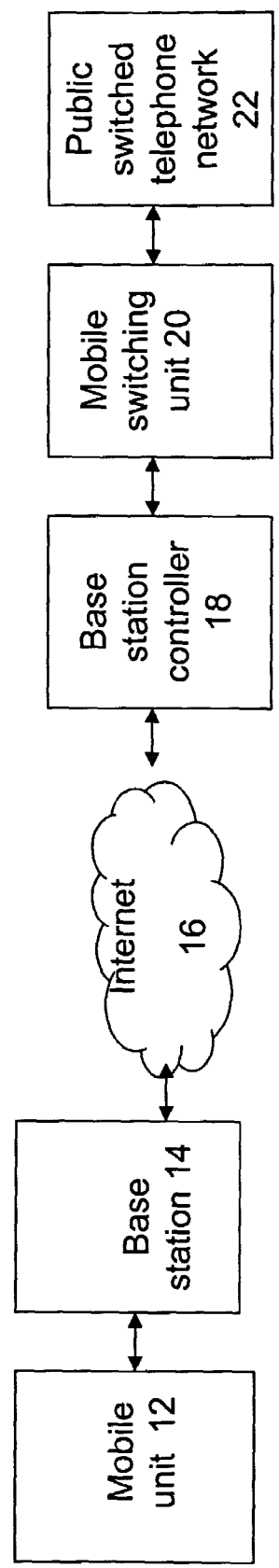
FIG. 1A is a block diagram of a network.

Referring to FIG. 1A, a system 10 includes a mobile unit 12, a base station 14. The base station is connected to the internet 14 close to the backbone and routs cellular traffic to the core network of a cellular service provider with lightweight, QoS mechanisms in place. The QoS mechanisms provide the required level of service for system 10 such that the system does not rely on the existence of excess bandwidth to provide the required level of service.

Figure 1B:
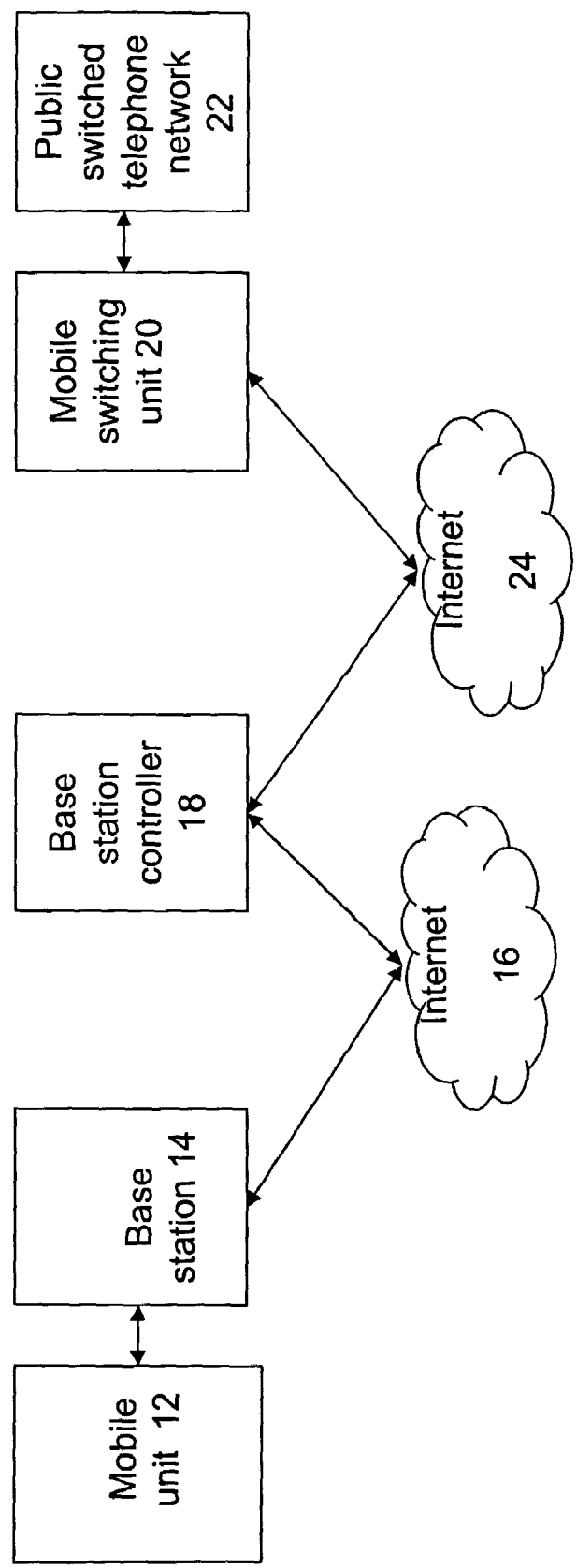
FIG. 1b is a block diagram of a network.

More particularly, system 10 includes a mobile unit 12 which sends wireless signal transmissions to a base station 14. The base station 14 routs the transmissions to a base station controller 18 over the internet 16 (e.g., the public internet). The base station controller 18 subsequently routs the calls to the mobile switching unit 20 and the mobile switching unit 20 routs the calls to the public switched telephone network 22. In some embodiments, the signal transverses a second network (e.g., internet 24) which is disposed between the base station controller 18 and the mobile switching unit 20 (FIG. 1B).

Signals can also be sent from the public switched telephone network 22 to the mobile unit 12 via the mobile switching unit 20, base station controller 10, internet 16, and base station 15.

Software radios can aid in the characterization of performance of the public Internet 16 for backhauling real-time cellular voice and data traffic. Various types of QoS measurements and mechanisms can be used to support such real-time cellular voice and data traffic.

In order to reduce the cost of cellular backhaul, it is useful to use the Internet. At this point in time, one of the easiest ways to assure a high level of Internet service is to connect devices close to the backbone. The location of the device relative to the backbone avoids a portion of the additional hops and constrained bandwidth at the edges of the network. The excess bandwidth in the backbone of the Internet 16 today, a result of overbuilding fiber in the core, can generally support the QoS requirements for cellular traffic. However, as users demand services in remote locations, more hops are typically required to provide services in those locations and QoS deteriorates. Similarly, when extraordinary traffic is experienced in the core network, even the current excess bandwidth may not provide adequate resources to efficiently meet demand.

Various protocols can be used to provide efficiency and bandwidth optimization. Exemplary protocols include TCP, UDP and RTP, as well as end-to-end application level QoS protocols implemented on top of these protocols.

In some embodiments, existing devices on the public internet 16 can be used to rout the calls from the mobile unit 12 to the public switched telephone network 22 using the public internet for backhaul without requiring the deployment of new routers or other hardware in the network. This enables use of the Internet for backhaul on a much more rapid timescale. It is believed that such an implementation will result in significant cost savings for wireless carriers today.

Figure 2:
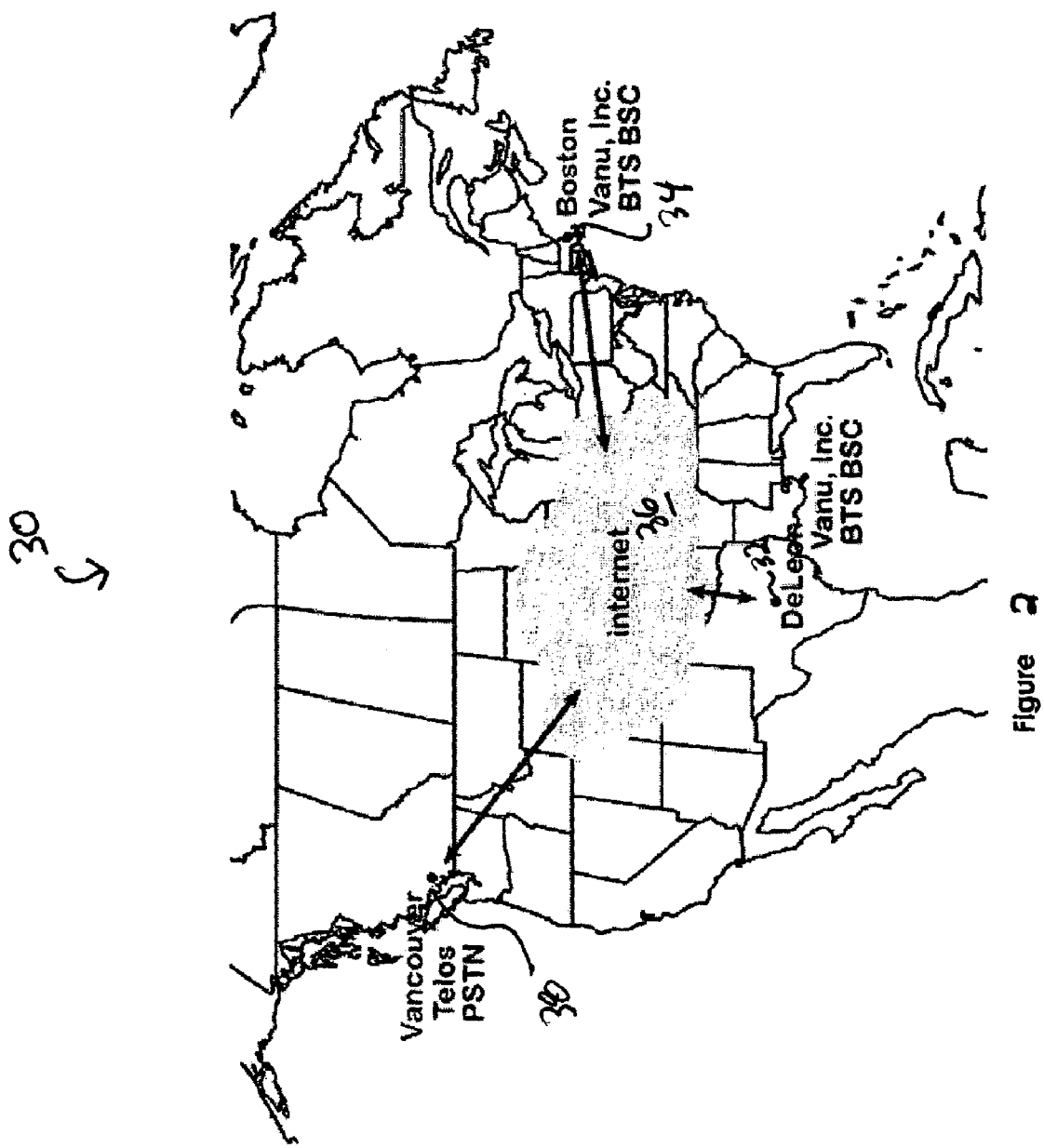
FIG. 2 is a block diagram of a network.

Referring to FIG. 2, an exemplary routing of a call over the internet 36 is shown. In this example, base stations located in Texas 32 and Cambridge 34, connected via the public internet 36 to mobile switching center 38 in Vancouver. Table 1 shows the number of hops between the base station 34 located in Cambridge and the switch 38 in Vancouver, and Table 2 shows the hops between the base station 32 located in Texas and the switch 38 in Vancouver.

TABLE 1

| | Traceroute to 207.23.93.38 from Cambridge, 30 hops max, 38 byte packets | | | | |
|---|---|---|---|---|---|
| 1 | pos | (192.168.0.1) | 0.436 ms | 0.291 ms | 0.211 ms |
| 2 | w225.z064221090.bos-ma.dsl.cnc.net | (64.221.90.225) | 1.062 ms | 0.872 ms | 0.877 ms |
| 3 | 208.177.193.1.ptr.us.xo.net | (208.177.193.1) | 146.914 ms | 200.582 ms | 168.402 ms |
| 4 | ge5-00.MAR2.Cambridge-MA.us.xo.net | (207.88.86.53) | 170.937 ms | 204.480 ms | 187.509 ms |
| 5 | p5-1-0-2.RAR2.NYC-NY.us.xo.net | (65.106.3.33) | 204.374 ms | 87.548 ms | 95.330 ms |
| 6 | p1-0.IR1.NYC-NY.us.xo.net | (65.106.3.42) | 111.932 ms | 113.313 ms | 181.227 ms |
| 7 | 206.111.13.18.ptr.us.xo.net | (206.111.13.18) | 132.570 ms | 148.973 ms | 98.475 ms |
| 8 | core1-newyork83-pos0-3.in.bellnexxia.net | (206.108.103.177) | 20.721 ms | 127.483 ms | 148.096 ms |
| 9 | core4-montreal02-pos6-3.in.bellnexxia.net | (206.108.99.189) | 133.495 ms | 314.225 ms | 248.051 ms |
| 10 | 64.230.243.238 | (64.230.243.238) | 269.619 ms | 93.072 ms | 94.338 ms |
| 11 | core1-vancouver-pos10-2.in.bellnexxia.net | (64.230.229.38) | 93.456 ms | 106.692 ms | 93.993 ms |
| 12 | dis4-vancouver-pos6-0.in.bellnexxia.net | (206.108.101.66) | 92.230 ms | 91.601 ms | 91.677 ms |
| 13 | 69.156.254.254 | (69.156.254.254) | 104.744 ms | 104.470 ms | 103.289 ms |
| 14 | blnt1-vlan2.hc.BC.net | (207.23.240.232) | 102.966 ms | 104.999 ms | 103.303 ms |

TABLE 1-continued

Traceroute to 207.23.93.38 from Cambridge, 30 hops max, 38 byte packets

| 15 | telostech2.BC.net | (134.87.24.62) | 170.350 ms | 128.600 ms | 120.643 ms |
| 16 | 134.87.54.6 | (134.87.54.6) | 115.420 ms | 132.120 ms | 111.732 ms |
| 17 | 207.23.93.38 | (207.23.93.38) | 111.607 ms | 127.547 ms | 125.545 ms |

TABLE 2 traceroute to 207.23.93.38 from MidTex, 30 hops max, 38 byte packets

| 1 | com-sa-1.cctc.net | (208.6.233.1) | 0.276 ms | 7.027 ms | 0.262 ms |
| 2 | sl-gw30-fw-1-1-0-TS24.sprintlink.net | (144.228.139.237) | 235.334 ms | 17.840 ms | 10.711 ms |
| 3 | sl-bb23-fw-2-0.sprintlink.net | (144.232.12.174) | 8.653 ms | 46.239 ms | 19.150 ms |
| 4 | sl-bb25-chi-6-0.sprintlink.net | (144.232.9.25) | 37.363 ms | 37.972 ms | 37.075 ms |
| 5 | sl-bb21-sea-1-0.sprintlink.net | (144.232.20.156) | 77.978 ms | 73.554 ms | 73.691 ms |
| 6 | sl-gw11-sea-8-0.sprintlink.net | (144.232.6.118) | 119.849 ms | 73.350 ms | 73.333 ms |
| 7 | sl-teleg-4-0.sprintlink.net | (160.81.36.14) | 82.840 ms | 74.541 ms | 74.457 ms |
| 8 | core2-seattle-pos0-1.in.bellnexxia.net | (206.108.102.197) | 74.743 ms | 87.826 ms | 74.935 ms |
| 9 | core2-vancouver-pos10-1.in.bellnexxia.net | (206108.102.210) | 83.550 ms | 91.493 ms | 78.653 ms |
| 10 | dis4-vancouver-pos9-0.in.bellnexxia.net | (206.108.101.70) | 99.620 ms | 78.485 ms | 159.792 ms |
| 11 | 69.156.254.254 | (69.156.254.254) | 78.796 ms | 78.648 ms | 78.711 ms |
| 12 | blnt1-vlan2.hc.BC.net | (207.23.240.232) | 82.164 ms | 81.627 ms | 78.636 ms |
| 13 | Telostech2.BC.net | (134.87.24.62) | 87.021 ms | 100.408 ms | 84.433 ms |
| 14 | 134.87.54.6 | (134.87.54.6) | 97.545 ms | 88.719 ms | 101.795 ms |
| 15 | 207.23.93.38 | (207.23.93.38) | 136.840 ms | 110.697 ms | 98.773 ms |

As shown in tables 1 and 2 above, routing the call utilizing the available internet connections can provide adequate quality of service. It is noted that the number and contribution of the hops towards the edge of the network comprise a significant portion of the delay. Therefore, it is believed that with a connection closer to the internet backbone or other public network of a data network service provider, there may be enough excess bandwidth to consistently meet the cellular backhaul QoS requirements with no QoS protocols or lightweight QoS protocols.

As shown in table 3 above, routing the call utilizing the available internet connections can provide adequate quality of service. The voice is transmitted using the RTP protocol, and there is potential backhaul bandwidth savings through the use of RTP header compression. This use of IP and other standard internet protocols provides a smooth path to transitioning to internet-based backhaul. It is noted that placing the base station near the internet reduces the number of hops. The impact on number of hops and total latency of transmission is significant. Placing the base station near the internet back-

TABLE 3 traceroute to vanu-bsc.dyn.nimlabs.org (24.239.114.151), 30 hops max, 38 byte packets:

| 1 | * * * (internal network node) | | | | |
| 2 | * * * (internal network node) | | | | |
| 3 | acs-24-239-114-151.zoominternet.net | (24.239.114.151) | 25.417 ms | 26.531 ms | 34.788 ms |
| 4 | acs-24-239-114-151.zoominternet.net | (24.239.114.151) | 25.561 ms | 20.253 ms | 52.069 ms | bone (thereby reducing the number of hops) can reduce the latency and ensure a higher level of QoS for voice transmission.

While the internet 36 typically provides excess bandwidth capable of providing adequate QoS, additional routing procedures and features may be used to provide the adequate QoS during loaded or crisis situations.

As described above, the use of multiple hops between the base station and the base station controller can increase the signal latency. For example, a typical Internet connection goes through several hops and bandwidth constrained links at the edge of the network. These edge routers and links are a major contributor to the overall bandwidth and latency of the connection. ISP's may choose to charge a higher fee to connect close to the backbone, but it is likely that this fee will still be much lower than T1 costs today which can range from $400-$2,000 per month, depending upon location and distance.

In order to test the operability of replacing T1 lines with a communication path utilizing the internet, various testing has been completed. A typical connection between a base station and base station controller using existing T1 lines can be used to measure the baseline bandwidth, latency and jitter for comparison purposes. The traffic load was generated by standard GSM mobiles, wirelessly connected to the software radio base station. The T1 connections were replaced with public Internet connections (e.g., as shown in FIG. 1A). The effective bandwidth latency and jitter were measured using similar load conditions as the baseline experiment.

Due to the unpredictable variation in use of the public internet, various types of application level QoS and failure recovery are desirable, although service without QoS mechanisms is also possible. In many real-time systems, TCP-style re-transmission is not appropriate, since the data will be too old by the time it is re-transmitted. Other approaches involve embedding error correction into the data stream so that lost packets can be reconstructed, or rules for dropping or repeating packets in the event of a loss. The most important parameter is keeping the call alive. In cellular systems, callers are accustomed to occasional drop outs or degradation in voice quality, but a dropped call is a significant problem. The recovery mechanism must insure that the mobile unit does not determine that the call has been dropped and terminate the connection.

As described above, various QoS mechanisms can be used to ensure the latency and quality of the signal transmitted from the mobile unit 12 to the public switched telephone network 22 over the internet 16. Since the internet 16 is a shared network it can be beneficial to use various techniques to ensure that the QoS is maintained such that there is not an interruption in the voice service for the customer.

In some embodiments, admission control can be used in data networks to insure a smooth flow of call data during times of extreme load in the network. In this case, the system would be making a quality/capacity tradeoff, supporting fewer voice calls but maintaining minimum quality standards.

Figure 3:
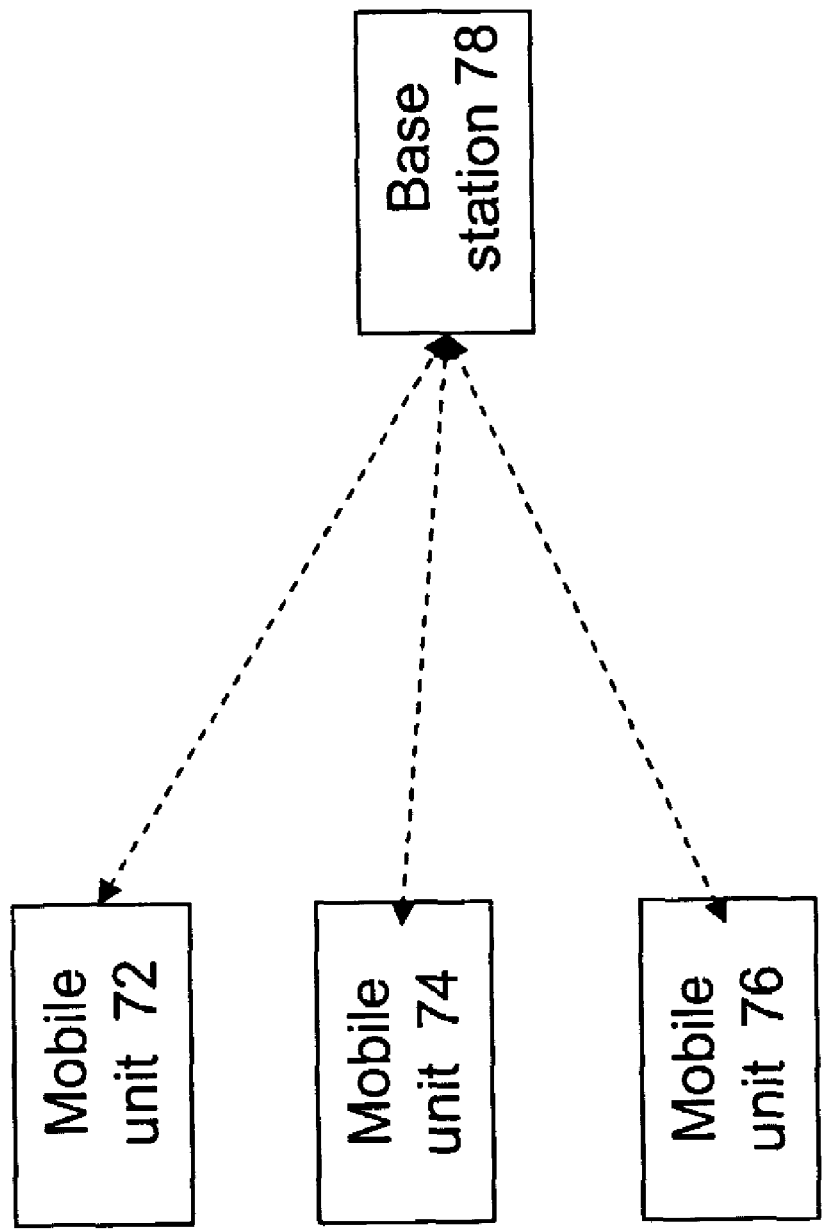
FIG. 3 is a block diagram of a network.

Referring to FIG. 3, a system 70 includes multiple mobile units 72, 74, and 76 and a base station 78. In operation, the mobile units 72, 74, and 76 generate signals and rout calls through the base station 78 to a base station controller and telephone network over the internet. Due to the variability of the bandwidth available on the shared network, the base station 78 can limit the number of mobile units and additional users for which the base station will concurrently process and rout the voice calls. If the internet is busy or does not have available bandwidth to ensure a predicted QoS, the base station 78 will reject the transmission from one or more of the mobile units.

Figure 4:
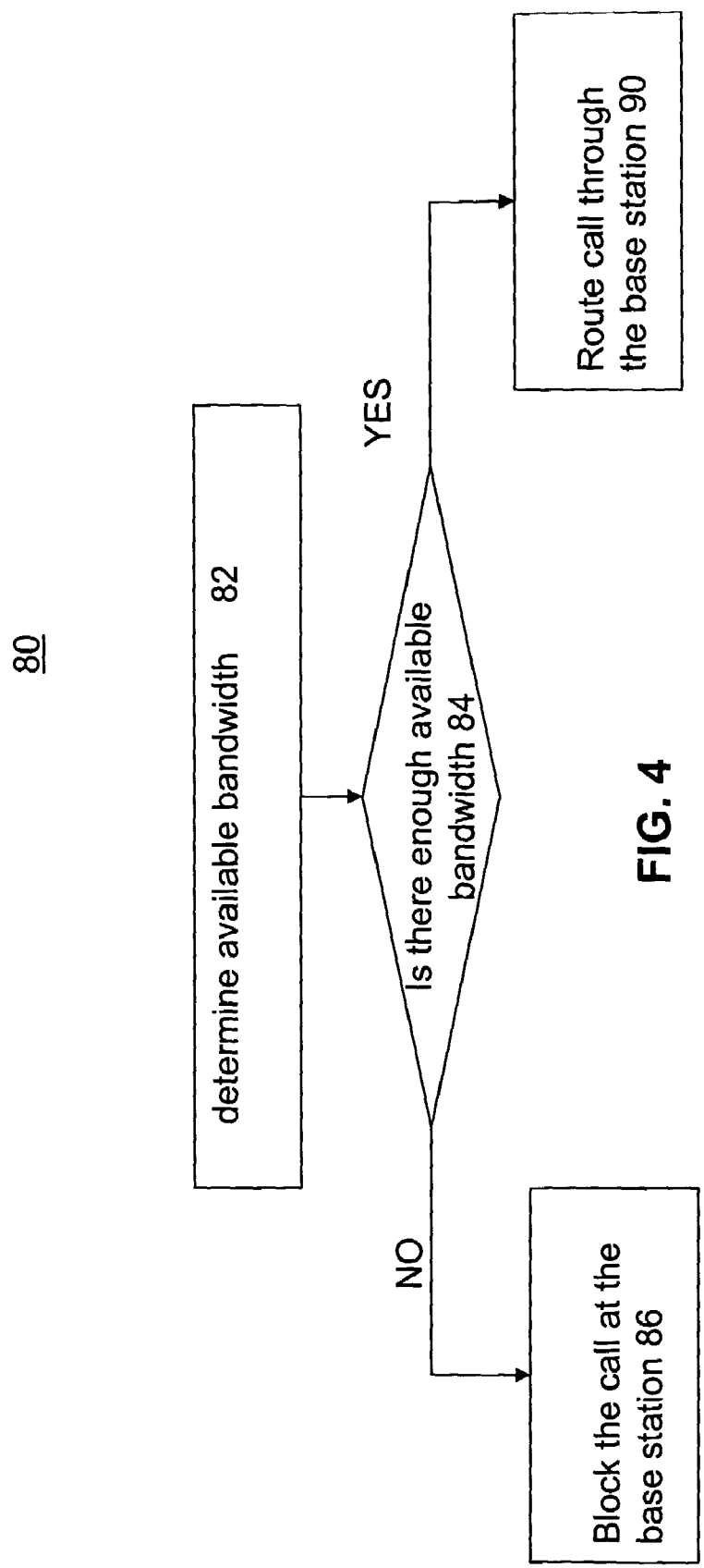
FIG. 4 is a flow chart.

Referring to FIG. 4, a process for insuring a QoS for a call during times of extreme load in the network is shown. The base station monitors and determines 82 an available bandwidth of the shared network. For example, the base station can ping another device on the network and monitor the response time for the ping packet. While using a ping packet does not provide a precise measurement of bandwidth, it can be used as a metric to determine if there is enough bandwidth available to ensure a particular level of quality for a voice call routed over the network. Based on the measured bandwidth, the base station determines 88 if there is enough bandwidth to support the voice call. If there is enough bandwidth, then the base station routs 90 the call through the base station over the internet to the base station controller. If there is not enough bandwidth, then the base station blocks 86 the call such that the call is not routed over the internet to the base station controller.

Figure 5:
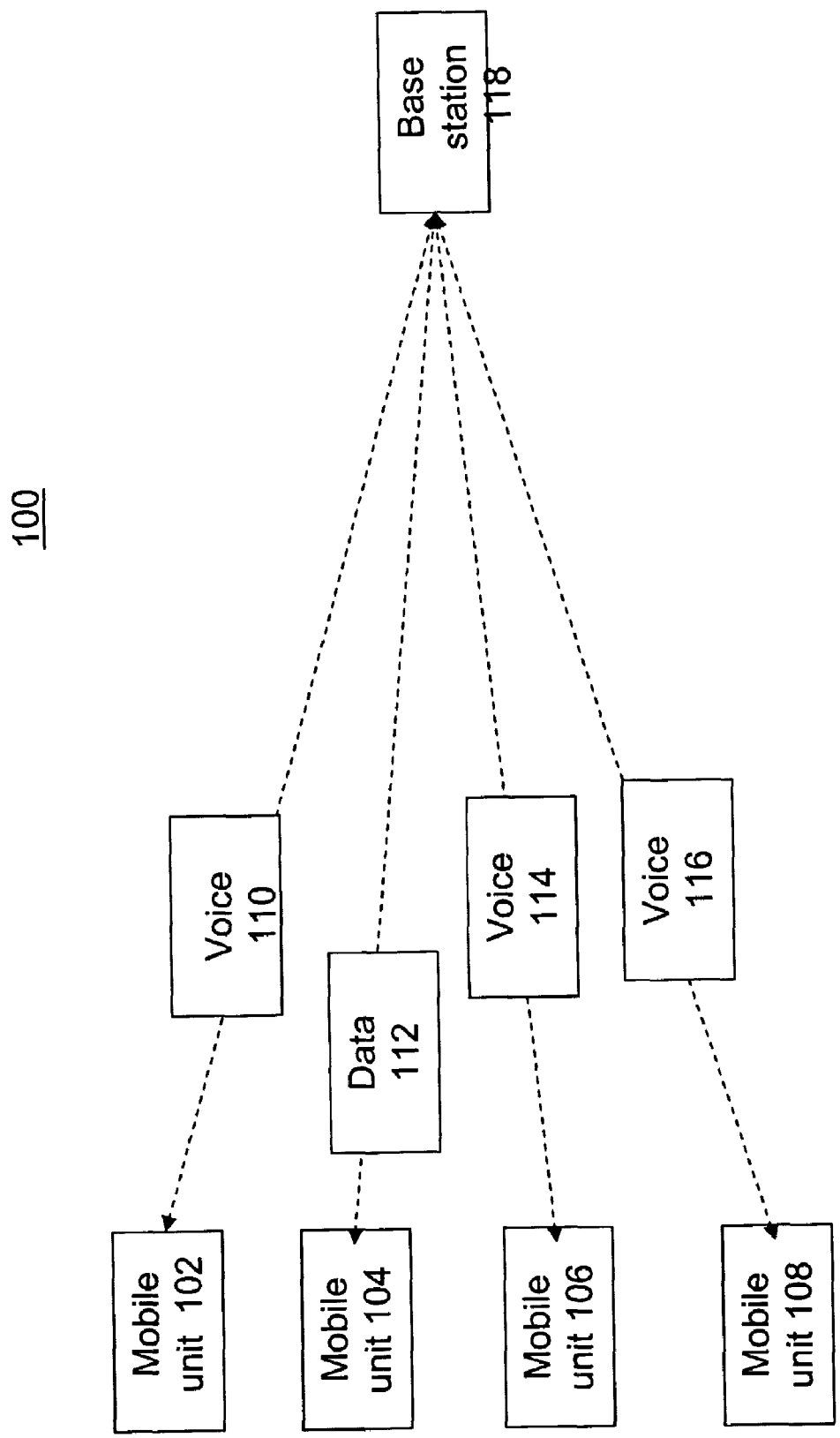
FIG. 5 is a block diagram of a network.

Referring to FIG. 5, a system 100 including multiple mobile units 102, 104, 106, and 108 and a base station 118 is shown. In operation, the mobile units 102, 104, 106, and 108 rout signals through the base station 118 to a base station controller. The mobile units 102, 104, 106, and 108 can rout both voice and data over the network. For example, mobile units 102, 106, and 108 are shown as transmitting voice data 110, 114, and 116 which mobile unit 104 is shown transmitting data 112. In general, the latency required for voice transmissions to ensure a desired quality level is lower than the latency required for a data transmission. Due to the variability of the bandwidth available on the shared network, the base station 118 can shift the transmission time for some transmissions in order to account for the bandwidth of the network. For example, if the network is at or near capacity, the base station 118 can delay the transmission of the data transmissions by a predetermined time, e.g., about 1 to 3 seconds. The shifting of the transmission time for data transmissions based on the available bandwidth allows users to more effectively use the bandwidth available on the shared network.

In some embodiments, the shared network can include a guaranteed bandwidth for a particular user. For example, if the network supports dedication of bandwidth, the base station can be allocated a sufficient bandwidth to ensure a particular level of quality for the transmission of calls.

In some embodiments, the system can include a jitter buffer at one or both ends of the backhaul link to compensate for jitter in the shared network. In general, signal processing systems include some jitter which is a random variation in the time required to complete any particular task. At the lowest levels of the system, the jitter is due to hardware effects, such as the relative time at which two chips request access to a shared bus. At higher levels, the jitter comes from variable and unpredictable network performance. The jitter buffers can ensure that the system will continue to process signals and present them to the system users in accordance with the relevant communications protocol even when significant jitter exists in the network.

In some embodiments, the use of software based radios can allow the functionality of the base station and the base station controller to be allocated as desired. For example, in a cellular link, the encryption/decryption of the data can be moved to the back end (e.g., the base station controller) side of the link. In addition, other functionality typically executed in the base station controller (e.g., power control) can be moved to the front end (e.g., the base station) of the link.

Figure 6:
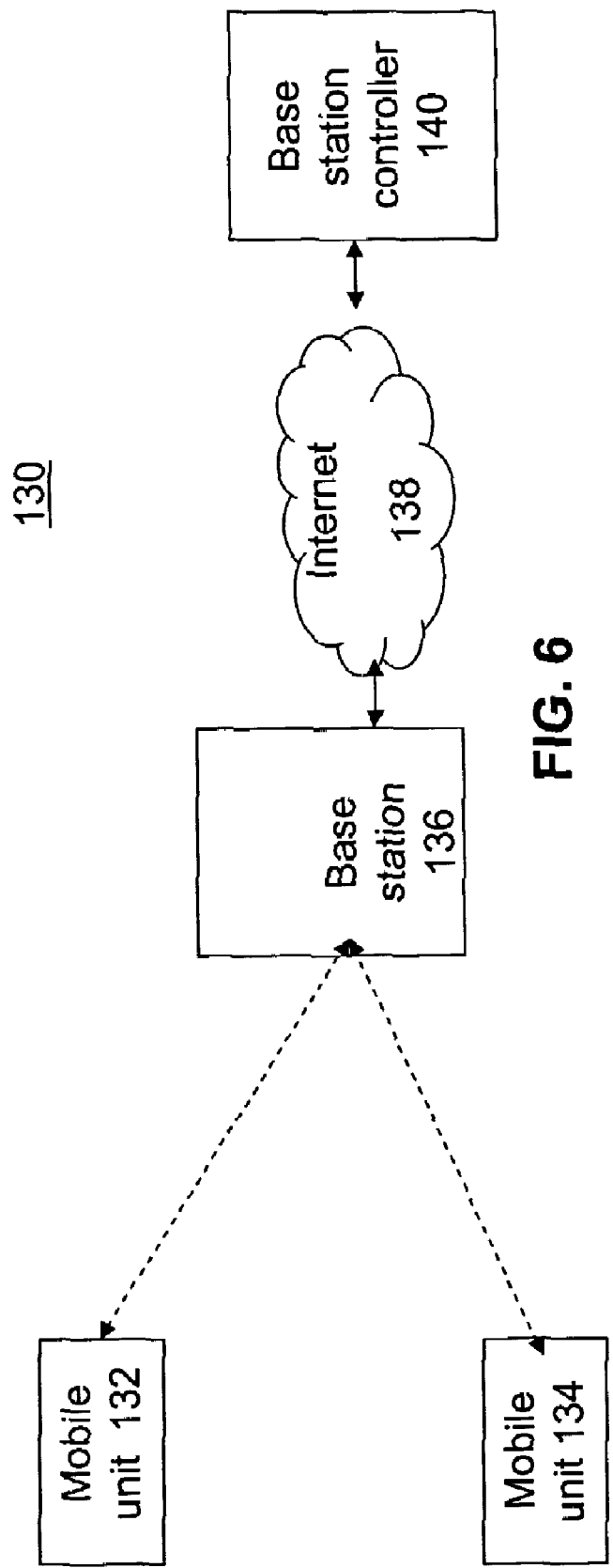
FIG. 6 is a block diagram of a network.

One exemplary re-distribution of functionality between the base station and the base station controller is shown in FIG. 6. A system 130 includes multiple mobile units 132 and 134, a base station 136, and a base station controller 140. During typical operation, certain switching operations occur at the base station controller. Therefore, if a mobile unit 132 desired to call mobile unit 134, the transmission would travel from mobile unit 132 to the base station 136 and across network 138 to the base station controller 140. This transmission can introduce latency in the transmission. In addition, the transmission will require a portion of the bandwidth of network 138. In a software based system, some of the switching functionality can be moved from the base station controller 140 to the base station 136. For example, the base station 136 can determine if a call is being routed to a callee on the same base station and if so then the call can be routed at the base station. Routing such calls locally at the base station reduces the backhaul bandwidth because the call never transverses network 138.

While in some of the embodiments described above, a QoS mechanism is used, other embodiments exist in which a QoS mechanism is not implemented.

There has been described novel apparatus and techniques for reducing the cost of cellular backhaul. It is evident that those skilled in the art may now make numerous modifications and uses of and departures from specific apparatus and techniques herein disclosed without departing from the inventive concepts. Consequently, the invention is to be construed as embracing each and every novel feature and novel combination of features present in or possessed by the apparatus and techniques herein disclosed and limited solely by the spirit and scope of the appended claims.

Other implementations are within the scope of the following claims:

What is claimed is:

1. A method for backhauling wireless voice and data transmissions, the method comprising:
   receiving, at a base station, a wireless transmission;
   forwarding the transmission from the base station to a base station controller over a shared network using a secure protocol;
   providing a jitter buffer at the base station controller; and
   using the jitter buffer to compensate for jitter introduced by the shared network.

2. The method of claim 1, wherein the secure protocol comprises SSL.

3. A method for backhauling wireless voice and data transmissions, the method comprising:
   receiving, at a base station, a wireless transmission;
   determining a priority of the received transmission;
   forwarding the transmission from the base station to a base station controller over a shared network based on the determined priority;
   providing a jitter buffer at the base station controller; and
   using the jitter buffer to compensate for jitter introduced by the shared network.

4. The method of claim 3, wherein determining a priority comprises:
   assigning a first priority to voice transmissions; and
   assigning a second priority to data transmissions, wherein the first priority is greater than the second priority.

5. A method for backhauling wireless voice and data transmissions, the method comprising:
   receiving, at a base station, a wireless transmission;
   forwarding the transmission from the base station to a base station controller over a shared network;
   providing a jitter buffer at the base station controller; using the jitter buffer to compensate for jitter introduced by the shared network; and performing decryption of the transmission at the base station controller.

6. A method for backhauling wireless voice and data transmissions, the method comprising:
   receiving, at a base station, a wireless transmission;
   forwarding the transmission from the base station to a base station controller over a shared network;
   providing a jitter buffer at the base station controller;
   using the jitter buffer to compensate for jitter introduced by the shared network; and
   performing power control at the base station.

7. A method for backhauling wireless voice and data transmissions, the method comprising:
   receiving, at a base station, a wireless transmission;
   forwarding the transmission from the base station to a base station controller over a shared network using a secure protocol comprising SSL;
   receiving, at the base station controller, a second transmission;
   forwarding the second transmission to the base station over the shared network;
   providing a jitter buffer at the base station; and
   using the jitter buffer to compensate for jitter introduced by the shared network.

8. A method for backhauling wireless voice and data transmissions, the method comprising:
   receiving, at a base station, a wireless transmission;
   forwarding the transmission from the base station to a base station controller over a shared network;
   receiving, at the base station controller, a second transmission;
   performing encryption of the second transmission at the base station controller;
   forwarding the second transmission to the base station over the shared network;
   providing a jitter buffer at the base station;
   using the jitter buffer to compensate for jitter introduced by the shared network; and
   performing power control at the base station.

9. A system for backhauling wireless voice and data transmissions, the system comprising:
   a base station configured to:
      receive a wireless transmission,
      determine a priority of the received transmission, and
      forward the transmission to a base station controller over a shared network based on the determined priority; and
   a base station controller configured to:
      receive a second transmission, and
      forward the second transmission to the base station over the shared network;
   wherein the base station controller comprises a jitter buffer configured to compensate for jitter introduced by the shared network.

10. A method for backhauling wireless voice and data transmissions, the method comprising:
   receiving, at a base station, a wireless transmission;
   forwarding the transmission from the base station to a base station controller over a shared network using a secure protocol;
   receiving, at the base station controller, a second transmission;
   forwarding the second transmission to the base station over the shared network;
   providing a jitter buffer at the base station;

using the jitter buffer to compensate for jitter introduced by the shared network; and performing power control at the base station.

11. A method for backhauling wireless voice and data transmissions, the method comprising:

receiving, at a base station, a wireless transmission;

determining a priority of the received transmission;

forwarding the transmission from the base station to a base station controller over a shared network based on the determined priority;

receiving, at the base station controller, a second transmission;

forwarding the second transmission to the base station over the shared network;

providing a jitter buffer at the base station;

using the jitter buffer to compensate for jitter introduced by the shared network; and performing power control at the base station.

12. A method for backhauling wireless voice and data transmissions, the method comprising:

receiving, at a base station, a wireless transmission;

forwarding the transmission from the base station to a base station controller over a shared network;

performing decryption of the transmission at the base station controller;

receiving, at the base station controller, a second transmission;

forwarding the second transmission to the base station over the shared network;

providing a jitter buffer at the base station;

using the jitter buffer to compensate for jitter introduced by the shared network; and performing power control at the base station.

13. A method for backhauling wireless voice and data transmissions, the method comprising:

receiving, at a base station, a wireless transmission;

forwarding the transmission from the base station to a base station controller over a shared network receiving, at the base station controller, a second transmission;

performing encryption of the second transmission at the base station controller;

forwarding the second transmission to the base station over the shared network;

providing a jitter buffer at the base station;

using the jitter buffer to compensate for jitter introduced by the shared network; and performing power control at the base station.

* * * * *